United States Patent [19]

Farrow et al.

[11] Patent Number: 4,727,440
[45] Date of Patent: Feb. 23, 1988

[54] DUAL-COLUMN TENSION AND SPEED CONTROLLER FOR HIGH SPEED TAPE TRANSPORTER

[75] Inventors: Robert I. Farrow; Richard L. Clark, both of Burlington, N.C.

[73] Assignee: American Multimedia, Inc., Burlington, N.C.

[21] Appl. No.: 837,068

[22] Filed: Mar. 6, 1986

[51] Int. Cl.$^4$ .................. G11B 15/18; G11B 15/58
[52] U.S. Cl. ...................... 360/71; 226/118; 318/7
[58] Field of Search ............... 226/113, 114, 118, 119; 242/184, 182, 183; 360/71, 15, 73; 318/6, 7

[56] References Cited

U.S. PATENT DOCUMENTS 3,543,983 12/1970 Dale et al. .................... 226/195

Primary Examiner—Raymond F. Cardillo
Assistant Examiner—Steven R. Garland
Attorney, Agent, or Firm—W. Thad Adams, III

[57] ABSTRACT

A closed loop, high-speed tape transporter (10) includes a vacuum supply (11A), a first vacuum column (40) operatively connected to the vacuum supply (11A) and positioned upstream from a pick-up head (100) and downstream from a tape bin (64) for receiving the loop of tape and exerting a vacuum-induced holdback tension thereon, a second vacuum column (50) operatively connected to the vacuum supply (11A) and positioned downstream of head (100) and upstream of the tape bin (64) for exerting a vacuum-induced pull forward tension on the tape in opposition to the holdback tension exerted on the tape by the first vacuum column (40). A motor-driven capstan (60) is positioned intermediate the pick-up head (100) and the second vacuum column (50). Capstan (100) is driven at a constant speed equal to the ideal reference tape duplication speed. Tape drive capstans (62A) and (70A) cooperate with the first and second vacuum columns (40) and (50) for moving the tape. A servo-control (42), (45), (48) senses changes in the position of the tape within the first vacuum column (40) and sends a signal to tape drive (70A) and a servo-control (58), (55), (56) senses changes in the position of the tape within the second vacuum column (50) and sends a signal to tape drive (62A). The speed of the tape is varied as it moves through the first and second vacuum columns (40), (50) thereby minimizing tension induced speed variation in the tape in the region of the pickup head (100).

12 Claims, 12 Drawing Figures

BOTH VACUUM COLUMNS IN EQUILIBRIM

TOO LITTLE TAPE IN VACUUM COLUMN 50-MOTOR 62A DECELERATES

TOO MUCH TAPE IN VACUUM COLUMN 40- MOTOR 70A DECELERATES

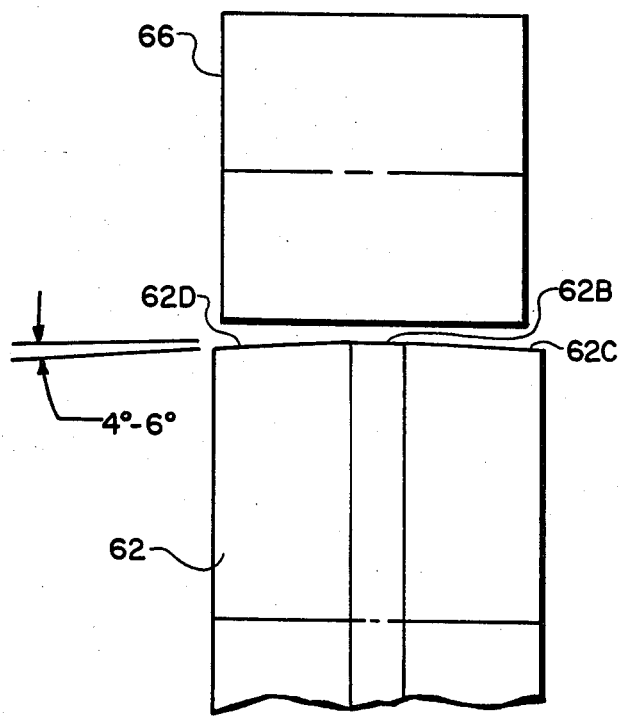

DUAL-COLUMN TENSION AND SPEED CONTROLLER FOR HIGH SPEED TAPE TRANSPORTER

TECHNICAL FIELD AND BACKGROUND OF THE INVENTION

This invention relates generally to the high-speed movement of tape where tension and speed control are critical factors. The particular disclosure of this application is a closed loop, high-speed tape transporter of the type used to duplicate audio signals off of a rapidly moving master tape onto tape at at least one slaved duplicator.

This process is carried out by passing a closed loop of recording tape across a pick-up head where a signal on the loop of tape is conveyed downstream to the slaved duplicator. The loop of tape is conveyed from the pick-up head into a storage bin for accumulation while a trailing length of the loop of tape is passed across the pick-up head. The loop continues endlessly from the bin back across the pick-up head, with each complete passage of the loop across the pick-up head providing a complete replication of the signal from the loop which is conveyed from the pick-up head to the slaved duplicator.

Typically, a relatively large number, such as ten, slaved duplicators are connected to a single tape transporter of the type described above. Hence, each complete passage of the master tape through the transporter results in ten copies being made. Eventually, these copies are loaded into cassettes for use in tape playback devices.

Tape duplicating processes are subject to a number of industry-imposed standards. A world-wide standard cassette playback speed has been set at 1⅞ inches per second (ips) 4.76 centimeters per second (cps) for many years. All speeds at which the tape is processed must therefore be referenced in some manner to this standard. Historically, this has required difficult trade-offs between tape processing speed and tape playback quality. As is well known, the higher the recording speed, the greater the fidelity and playback quality which is obtained. At one time, the tape duplicating industry recorded master tapes at 7.5 ips (19 cps), thereby achieving a very high quality standard. However, in an effort to increase efficiency and output, the duplicating industry began duplicating at 64 times normal speed. However, to reproduce at 64 times 7.5 ips (19 cps) would mean a master tape speed of 480 ips (1219 cps). This was found to be impossible to achieve on a commercial basis, since the master tapes very quickly broke or wore out and, in addition, the playback quality of the duplicated tape was very poor. Therefore, in order to maintain the 64 to 1 ratio, the master recording speed was cut in half to 3.75 ips (9.5 cps), thereby permitting a 64 to 1 duplicating ratio at a master tape speed of 240 ips (610 cps). When 3.75 ips (9.5 cps) was adopted as standard master recording speed, this was acceptable because cassette tape and duplicating slaves were not capable of producing quality sufficient to take advantage of higher recording speeds. However, with the advent of new types of tape, improved recording heads, more sophisticated electronics and the development of Dolby HX Pro high frequency headroom extension system, it became clear that recording the master at 3.75 ips (9.5 cps) constituted a strict upper limit on the quality which could be achieved. Repeated attempts to increase the duplicating speed to 480 ips (1219 cps) has resulted in inefficiencies caused by frequent master tape replacement and poor playback quality. Many of these attempts have involved increasing the speed of the tape transporting capstans in an attempt to simply move the master tape more rapidly through the transporter. However, the physical affects of moving a relatively thin tape at ever increasing speeds are not always linear or even predictable. Experience in the design of tape transporting devices has shown that many different variables controlling tape movement must be controlled and improved to achieve operating efficiency combined with high frequency amplitude stability, high frequency phase stability, and an enhanced stereo image on the end product cassette tape.

The invention described in this application permits a master to be recorded at 7.5 ips (19 cps), and duplicated at a 64 to 1 ratio while substantially improving the efficiency of the tape transporter and the quality of the cassette tape.

SUMMARY OF THE INVENTION

Therefore, it is an object of the invention to permit higher master tape recording speed in a tape duplication system while permitting tape duplication to occur at high record to duplication ratios;

it is another object of the present invention to provide for precise speed control of a closed loop of recording tape on a high-speed tape transporter;

it is another object of the invention to provide improved control of the tension on a rapidly moving closed loop of recording tape in a tape transporter;

it is yet another object of the invention to provide a means of cleaning dust and loose oxide particles from a master tape without damaging the tape and without varying the speed or tension on the tape;

it is still another object of the invention to provide a tape transporter wherein control of the speed of the tape and control of the tension on the tape is performed by separate capstans.

These and other objects of the present invention are achieved by providing a closed loop, high-speed tape transporter of the type wherein a closed loop of recording tape is passed across a pick-up head where a signal on the loop of tape is conveyed downstream to at least one slaved duplicator, and wherein the loop of tape is conveyed from the pick-up head into a bin for accumulation and storage while a trailing length of the loop is passed across the pick-up head, and from the bin back across the pick-up head repeatedly whereby successive replications of the signal from the loop are conveyed from the pick-up head to the slaved duplicator.

The improvement comprises a vacuum supply and first and second vacuum columns. The first and second vacuum columns are each operatively connected to the vacuum supply and are positioned in the plane of tape travel. The first vacuum column is positioned upstream from the pick-up head and downstream from the tape bin for receiving the loop of tape during its travel and exerting a vacuum induced hold-back tension thereon. The second vacuum column is positioned in the plane of tape travel downstream of the pick-up head and upstream of the tape bin for exerting a vacuum induced pull forward tension on the tape in opposition to the holdback tension exerted on the tape by the first vacuum column.

A motor-driven capstan is positioned in the plane of tape travel intermediate the pick-up head and the second vacuum column and is driven at a constant speed equal to the ideal reference tape duplication speed. Tape drives are associated with the first and second vacuum columns and a servo-control is provided for sensing changes in the position of the tape within the first and second vacuum columns and sending a signal responsive thereto to the tape drives for varying, respectively, the speed at which the tape is moved through the first and second vacuum columns and minimizing tension induced speed variation in the tape in the region of the pick-up head.

Preferably, the first and second vacuum columns each comprise an enclosure having a depth approximately that of the tape to provide a seal between that portion of the vacuum column outside the loop of tape and that portion of the vacuum column inside the loop of tape. In each vacuum column, at least one sensing slot is positioned in vacuum communication with the vacuum supply and interrupts the seal between the outside and inside of the loop of tape within the vacuum column and communicates information corresponding to tape position-related vacuum pressure to the servo-control for servo regulating the speed of the tape drives associated with the respective first and second vacuum columns.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 12 is a cross-sectional view of the crowned capstan roller according to the invention.

DETAILED DESCRIPTION OF THE PREFERRED EMBODIMENT

Figure 1:
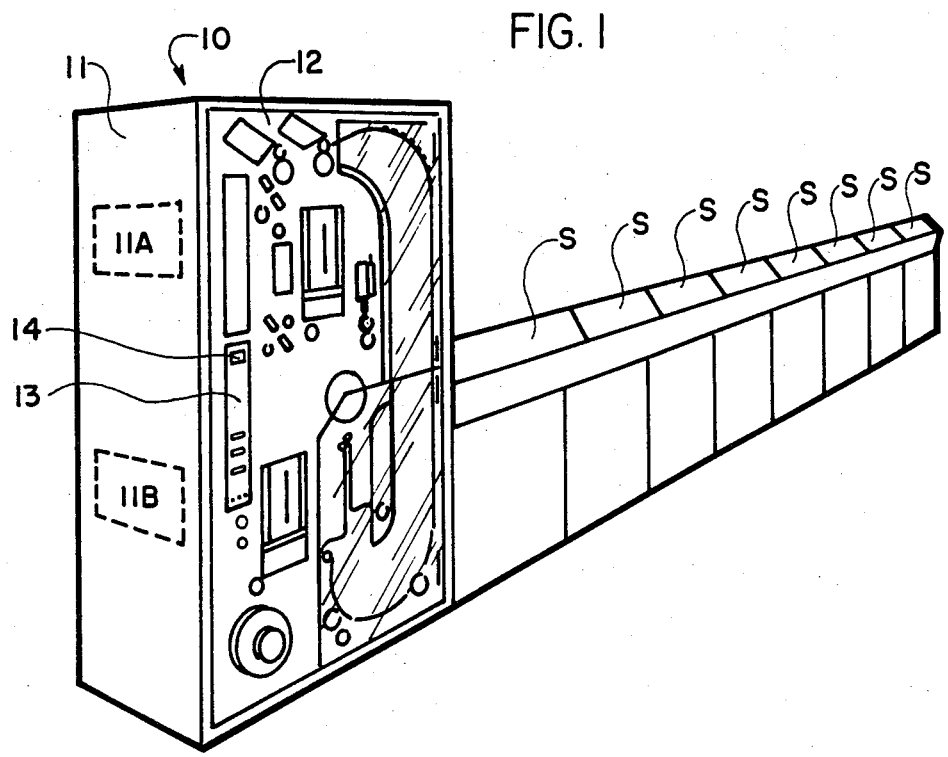
FIG. 1 is a perspective view of a tape transporter according to the present invention, in combination with a plurality of slaved duplicators.

Referring now specifically to the drawings, a closed loop high-speed tape transporter according to the present invention is shown in FIG. 1 and broadly indicated at 10. Tape transporter 10 comprises a cabinet enclosure 11 within or on which all of the working parts of transporter 10 are contained. As can be seen, all of the tape manipulating portions of transporter 10 are contained on a vertically extending front panel 12. A vacuum supply 11A, a microprocessor-based controller 11B and all other auxiliary equipment are contained in cabinet 11 behind front panel 12. Tape transporter 10 is electrically connected to a series of slave units "S." Each slave unit reproduces the program on the endless master tape onto, for example, audio cassette tape and winds the audio cassette tape onto a large reel, usually referred to as a "pancake" which is then loaded onto a cassette loader. The cassette loader takes a "C-0" cassette, extracts the leader, cuts the leader and splices one half of the leader onto the leading end of recorded audio tape on the pancake, winds a single reproduction of the program recorded from the master tape into the cassette, then splices the trailing end of the audio tape onto the second half of the cassette leader, ejects the cassette and then repeats the process.

Brief Description of Tape Handling Components

Figure 2:
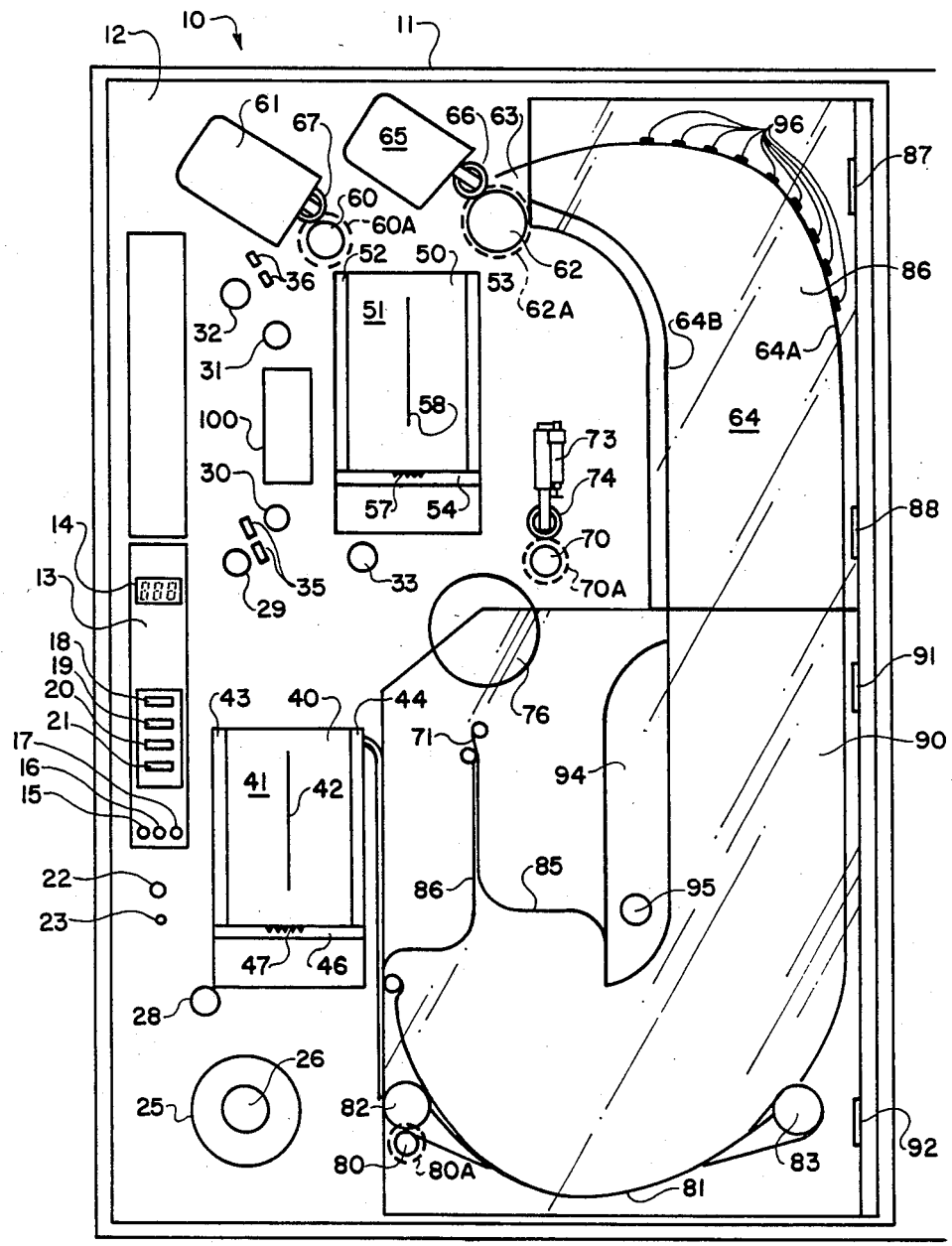
FIG. 2 is a front elevational view of the tape transporter of the type shown in FIG. 1.

Referring now to FIG. 2, front panel 12 of tape transporter 10 includes a control panel 13 having a display 14 and switches 15-23, inclusive, the functions of which are described below. A lockable hub 25 driven by a motor 26 is positioned in the lower left hand corner of front panel 12 and is used only when loading a tape. Freewheeling guides 28-33, inclusive, are positioned in predetermined spaced-apart relation on front panel 12 and cooperate with other tape contacting surfaces to establish the proper path of the closed loop of tape. A pair of optical sensors 35 are positioned intermediate tape guides 29 and 30 and a similar pair of optical sensors 36 are positioned near guide roller 32. The tape path extends between these two respective pairs of sensors 35 and 36 and prevent operation of the tape transporter if the tape is improperly threaded.

A vacuum column 40 is positioned on the lower half of front panel 12 immediately above hub 25. Vacuum column 40 includes a back wall 41 which includes a sensing slot 42 which senses the vacuum pressure within vacuum column 40 at any given time. In addition to back wall 41, vacuum column 40 is defined by outwardly extending, spaced-apart side walls 43 and 44, a bottom wall 46 and a transparent cover (not shown). Vacuum ports 47 in bottom wall 46 communicate with a vacuum supply to exert a vacuum force in vacuum column 40. The depth of side walls 43 and 44, and bottom wall 46 is essentially the same as the width of the tape. Therefore, when tape is in vacuum column 40, it defines an upper vacuum column zone in communication with atmospheric pressure, and a lower, enclosed vacuum column zone defined by the tape and the lower portion of the side walls 43 and 44 and bottom wall 46. The lower zone, which is sealed against communication with atmospheric pressure by the tape, communicates with vacuum supply through vacuum ports 47.

Another vacuum column 50 is positioned in the upper half of front panel 12 and includes a back wall 51, outwardly extending, spaced-apart side walls 52 and 53, a bottom wall 54 and a transparent cover (not shown). Vacuum pressure is exerted on vacuum column 50 by vacuum through vacuum ports 57. A sensing slot 58 is provided in back wall 51.

Vacuum column 50 operates in the same manner as vacuum column 40. Further details concerning the operation of vacuum column 40 and 50 are set forth below.

Tape transporter 10 includes four motor driven capstans. Capstan 60 is powered by a synchronous electric motor 60A which runs at a constant speed at all times during the tape duplication process. The only function of capstan 60 is to move the tape at a precise and constant speed. A pinch roller assembly 61, which includes a hard rubber pinch roller 62 rides on the surface of capstan 60 and the tape therebetween. A capstan 62 is positioned downstream of vacuum column 50 and at an entrance 63 to a tape storage bin 64. Capstan 62 is driven by a servo-controlled motor 62A which is coupled to sensing slot 58 and varies the speed of capstan 62 to maintain the loop of tape in a reference position within vacuum column 50. A pinch roller assembly 65, including a hard rubber pinch roller 66, rides on the surface of capstan 62.

A capstan 70, controlled by a servo motor 70A coupled to vacuum column 40 is positioned above exit 71 from bin 64. A pinch roller assembly 73, including a hard rubber pinch roller 74, cooperates with capstan 70. Tape is delivered to capstan 70 by a vacuum guide roller 76.

A capstan 80 is driven by a variable speed motor 80A and is positioned in the bottom of tape bin 64 and drives a low speed flat belt 81. Belt 81 is positioned in driving relation between two rollers 82 and 83. Belt 81 is driven counterclockwise and moves the pack of tape loops from right to left and, at the same time, inverts the tape pack so that tape is being removed from the top rather than the bottom of the pack.

As the tape is pulled through the exit 71 of bin 64, dampening belts 85 and 86 eliminate a significant amount of tape flutter and prevent twisting of, and possible damage to, the tape as it exits tape bin 64.

Bin 64 is approximately the same thickness as the tape and includes side rails 64A and 64B to guide the tape downwardly. The upper portion of bin 64 is covered by a glass door 86 mounted on hinges 87 and 88. Vacuum ports 96 are positioned along side rail 64A in tape contacting position. The lower portion of bin 64 is enclosed by a glass door 90 which is pivoted on hinges 91 and 92. As can be seen by continued reference to FIG. 2, a vacuum chamber 94 is positioned adjacent bin 64 and includes a vacuum port 95. Vacuum chamber 94 communicates with bin 64 and exerts a vacuum pull on the lower extent of tape bin 64.

Finally, a reproduce head 100 is positioned between guide rollers 30 and 31. As tape passes across reproduce head 100, the analog signal on the magnetic tape is sensed and transmitted by suitable electrical circuitry downstream to the plurality of slaved tape duplicators "S."

Procedure For Loading Master Tape Into Bin

Figure 3:
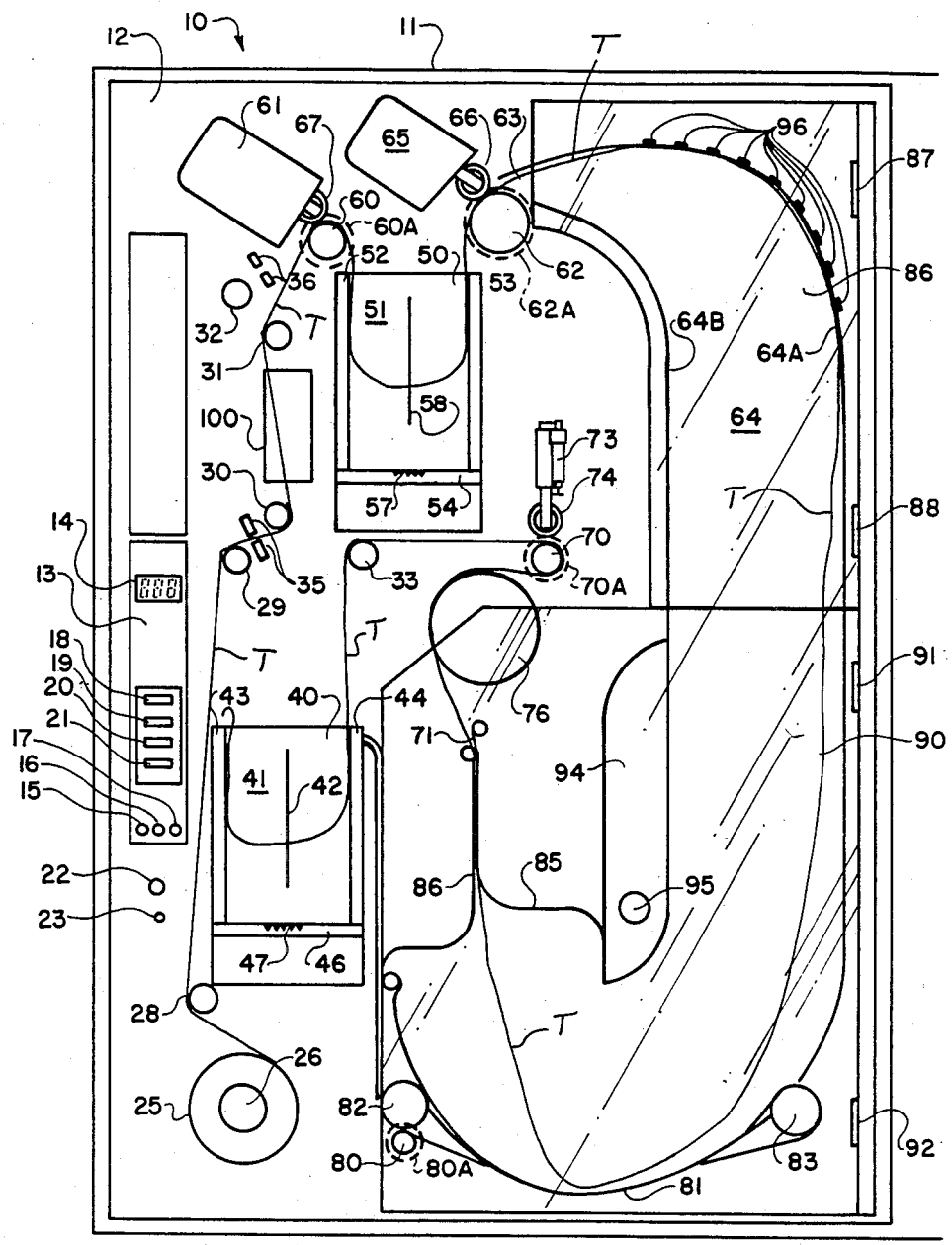
FIG. 3 is a view of the tape transporter in FIG. 3, showing the threading pattern while loading the master tape.

Referring now to FIG. 3, a master tape "T" which is stored on a suitably sized reel is placed on lockable hub 25. Motor 26 rotates in a clockwise direction and therefore provides a holdback tension on the master tape, allowing it to ride over guide 28. The operator pulls the tape to the left of guides 28 and 29, between optical sensors 35 and to the right of guide 30. Sensors 35 detect the presence of the master tape before allowing transporter 10 to start its motors. This reduces the risk of operator error in misthreading the master tape. Sensors 35 also signal the controller 11B when the end of the master tape has passed guide roller 29. Controller 11B stops the loading process whenever the tape is not between sensors 35.

The tape is next threaded to the left of guide 31 and between capstan 60 and pinch roller 67. Upper door 86 of tape bin 64 is opened and the operator pulls the tape between capstan 62 and pinch roller 66 and down the outside rail 64A of bin 64. Then, the bottom door 90 is opened and the operator pulls the tape under the bottom of the inside rail 64B of bin 64 and up through dampening belts 85 and 86. The tape is advanced about four or five feet more before doors 86 and 90 are closed. The tape is then passed to the left of and over vacuum guide roller 76 to the right of and over capstan 70 and over and to the left of guide 33 and then down into the vacuum column 40, where the leading end of the tape resides during loading.

Switch 15 is then placed in the "low" position, switch 16 engages pinch rollers 67 and 66 with capstans 60 and 62 respectively. Switch 17 turns on the vacuum blowers. As soon as the vacuum pressure is at the correct level (3-5 seconds) the operator threads the section of tape between capstans 60 and 62 down into vacuum column 50. Switch 18, the "start" switch, is pressed and the controller 11B carries out a number of system checks. Transporter 10 will not start if capstan 60 is spinning, since this might damage the tape. Likewise, if the tape is not between sensors 35, the transporter 10 will not start since this indicates a misthreading of the tape.

Figure 5:
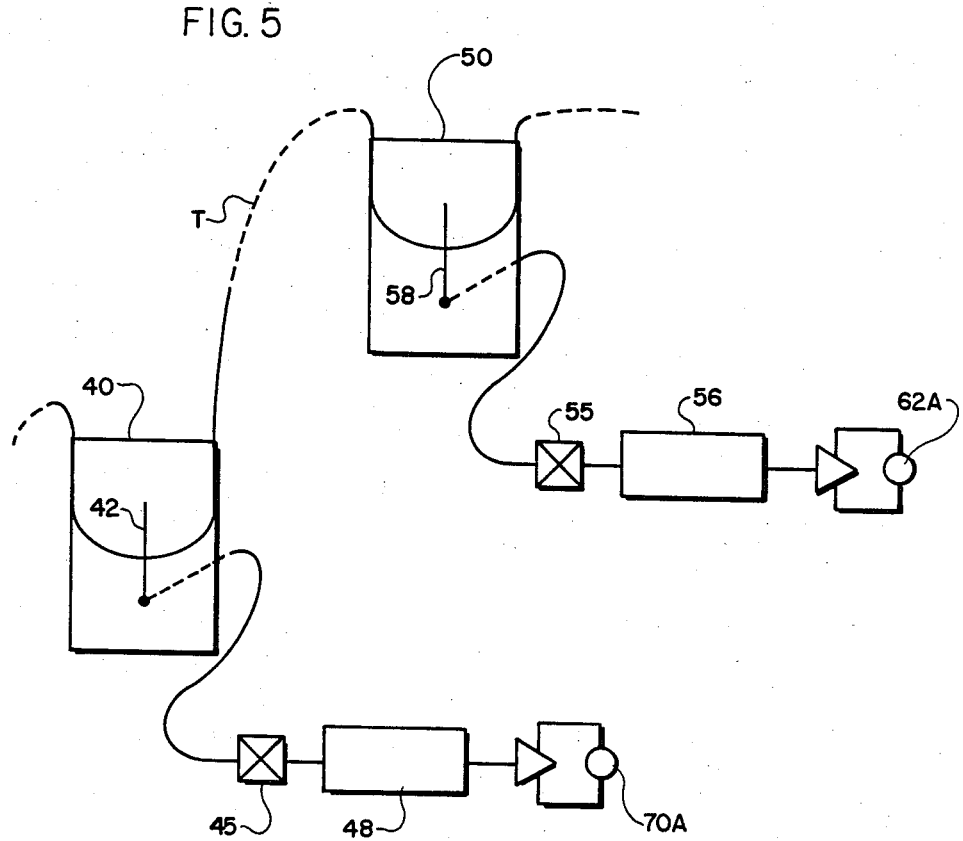
FIGS. 5, 6 and 7 are schematic views showing the tension and speed control function of the vacuum columns on the tape transport.

Once all test conditions have been met, capstan 62 begins turning. During the first four seconds, capstan 62 is rotated slowly to remove any slack in the tape path between hub 25 and capstan 62, except for the correct amount of tape in vacuum column 50. As is illustrated in FIG. 5, this amount is detected by a column transducer 55 which detects the vacuum in column 50 through slot 58. The column transducer 55 generates a voltage to a servo circuit 56 which is proportional to the vacuum level within column 50. Servo circuit 56 controls the speed of motor 62A. As the tape is pulled higher within vacuum column 50, the pressure becomes more negative. When the pressure reaches a preset value, the tape is correctly positioned in vacuum column 50.

Once this condition has been achieved, full power is applied to capstan 60 and the tape is pulled off of hub 25 and is allowed to drop into vacuum column 50. The servo circuit 56 controlling capstan 62 senses this level change and rotates capstan 62 clockwise at a speed sufficient to remove the same amount of tape as is being added to vacuum column 50 by capstan 60. This process continues until the tail end of the tape passes from between sensors 35 and the sensors are no longer blocked.

At any point during this loading operation, the operator may stop the process by pressing switch 19.

As the tape leaves capstan it 62, is forced to project outwardly in a straight line by a slight curve which has been introduced into the tape by a crowned surface on capstan 62. (See FIG. 12). This eliminates the need for knife-like strippers near the point of tape departure at capstan 62. The tape is moving at 480 ips (1219 cps) during most of the load cycle. As noted above, this is the same speed at which the transporter 10 operates during the duplication cycle. This is necessary to insure that the tape packs in the bin 64 in the same manner as it will while running in service.

Figure 4:
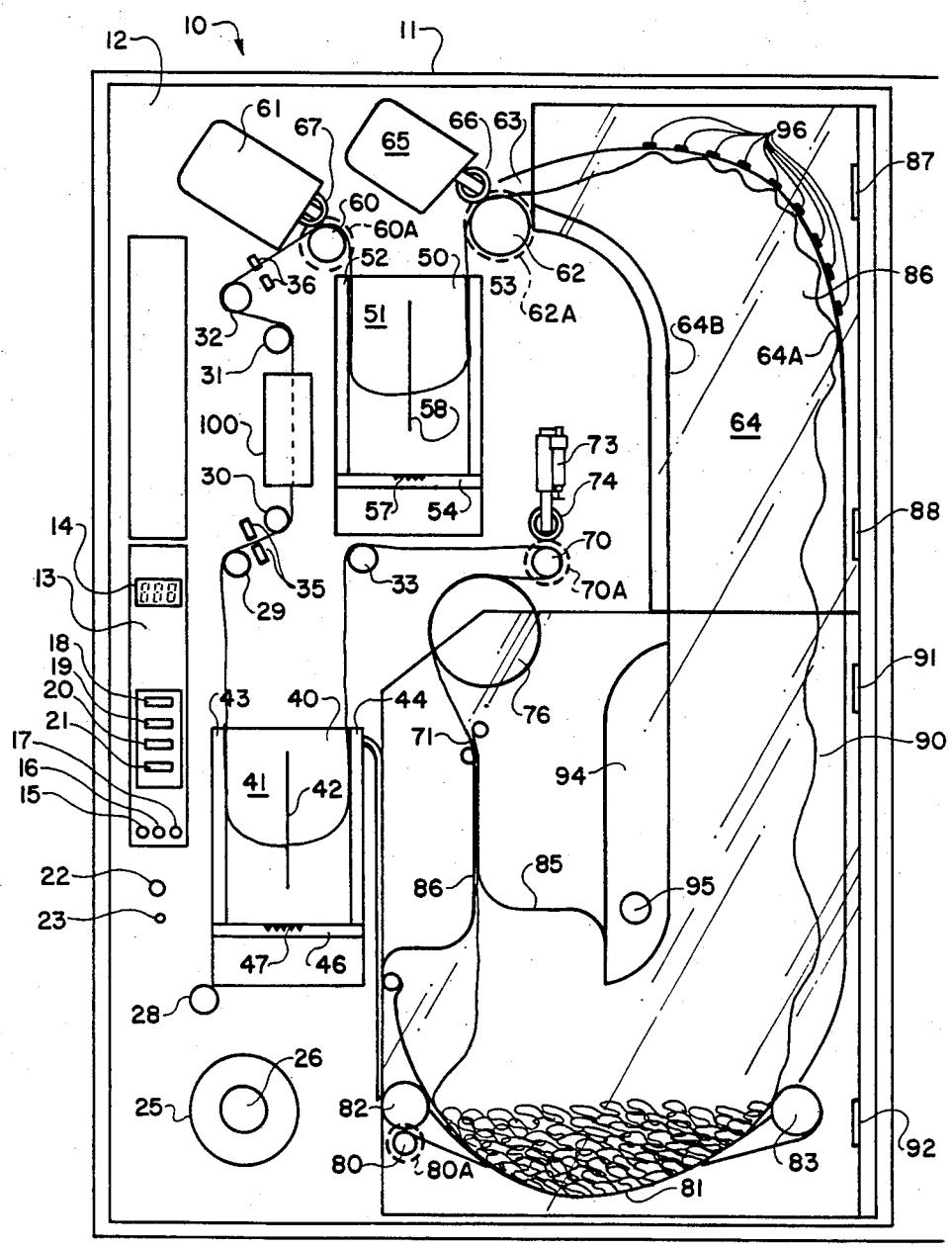
FIG. 4 is a view of the transporter shown in FIG. 2, with the tape loaded for duplication.

The tape is allowed to contact the upper section of the 74A bin rail at a distance of approximately five to six inches (12.7-15 cm) from capstan 62. This rail is made of stainless steel and is polished to prevent scratches in the tape oxide surface. This rail also performs another function in that it decelerates the tape before it packs in the bottom of tape bin 64, as will be explained further below. It is important that this deceleration occur. If the tape is allowed to impact the pack in the bottom of bin 64 at full speed, a number of problems result. The pack does not form in a manageable fashion and tape forms such large loops that it occupies too much space and the bin 64 will not hold long length programs. The high impact may also damage the surface of the tape causing loss of fidelity in the final product and premature replacement of the master tape. For this reason, the vacuum ports 96 are connected to a high capacity low level vacuum source. As the tape passes the ports 96, the vacuum progressively impedes the progress of the tape along the rail slightly in relation to the tape which has not yet hit the first vacuum port 96. This causes the tape to form loops. The vacuum level is quite low and the tape is merely slowed somewhat, but not stopped. As the moving tape passes across the successive vacuum ports 96, it forms progressively larger loops as it descends. As is shown in FIG. 4, the loops decrease in frequency and increase in amplitude as they descend into the bottom tape bin 34. Not only is the tape protected by slowing it somewhat, but the formation of the loops by vacuum ports 96 assist the tape in falling into bin 64 in an even, regular pattern of loops.

While bin 64 is being filled with tape, belt 81 is driven at a slow speed by capstan 80, as described above, so that the pack of tape is inverted, permitting tape to be removed from the bin during the run mode without being pulled from the bottom of the pack where it is under high pressure due to the weight of the tape above it.

During the loading process, the controller 11B monitors the speed of motor 26. Because the speed of the tape is held at a constant 480 ips (1219 cps) by the constant speed of capstan 60, the rotational velocity of motor 26 continues to increase as the diameter of the reel of tape decreases. At a predetermined velocity, which indicates the end of the tape is approaching, controller 11B reduces the average power transmitted to capstan 60 and the tape slows to approximately 200 ips (508 cps) during the last few hundred feet.

When the end of the tape passes through sensors 35, the controller disengages the pinch rollers 67 and 66 from capstans 60 and 62 respectively, and removes power from motors 60A, 62A, 70A and 80A. This allows the tail of the tape to be pulled down into vacuum column 50 and held there by vacuum.

Finally, the operator removes the two ends of the master tape from vacuum columns 40 and 50, respectively, and applies a splice, thus making the tape a continuous closed loop. Ordinarily, the splice includes a short section of transparent tape which forms a "window" through which sensors 35 and 36 can see as the tape completes each circuit. This "window" is used to generate a cueing signal which is applied to the tape being reproduced at the slave duplicators "S" so that the end of a particular program segment can be detected.

Procedure for Running Master Tape

After completing the loading procedure, the tape must be threaded in a slightly different path. Referring now to FIG. 4, the vacuum supply 11A is left on and the tape is allowed to drop into vacuum column 40 and 50. The tape exits the left side of vacuum column 40 and passes to the left of guide roller 29 through sensors 35 and to the right of guide roller 30. The tape is placed in front of the reproduce heads and to the right of guide roller 31. The tape must then be placed to the left of guide roller 32 through optical sensors 36 and between capstan 60 and pinch roller 67. The tape is then placed between pinch roller 66 and capstan 62.

At the exit 71 of tape bin 64, the tape passes between dampening belts 85 and 86 and clockwise around vacuum holdback guide 76 which directs the tape into capstan 70. The tape passes between capstan 70 and pinch roller 74 in a counterclockwise direction and over guide roller 33. The tape drops into vacuum column 40, completing its circuit.

To start operation, the operator sets switch 15 to the "run" mode, closes switch 16 to engage pinch rollers 67 and 66 with capstans 60 and 62, respectively, and checks switch 17 to insure that the vacuum supply is still operating. By pressing switch 18, the controller 11B checks to make sure that capstan 60 is stationary. It is important to make sure that capstan 60 is not rotating before tension is applied to the tape, since this may cause the tape to skew off of capstan 60. Frequently, this damages the edge of the tape.

Both sets of sensors 35 and 36 must indicate that tape is blocking light transmission, thereby insuring that the tape has been properly threaded.

Figure 6:
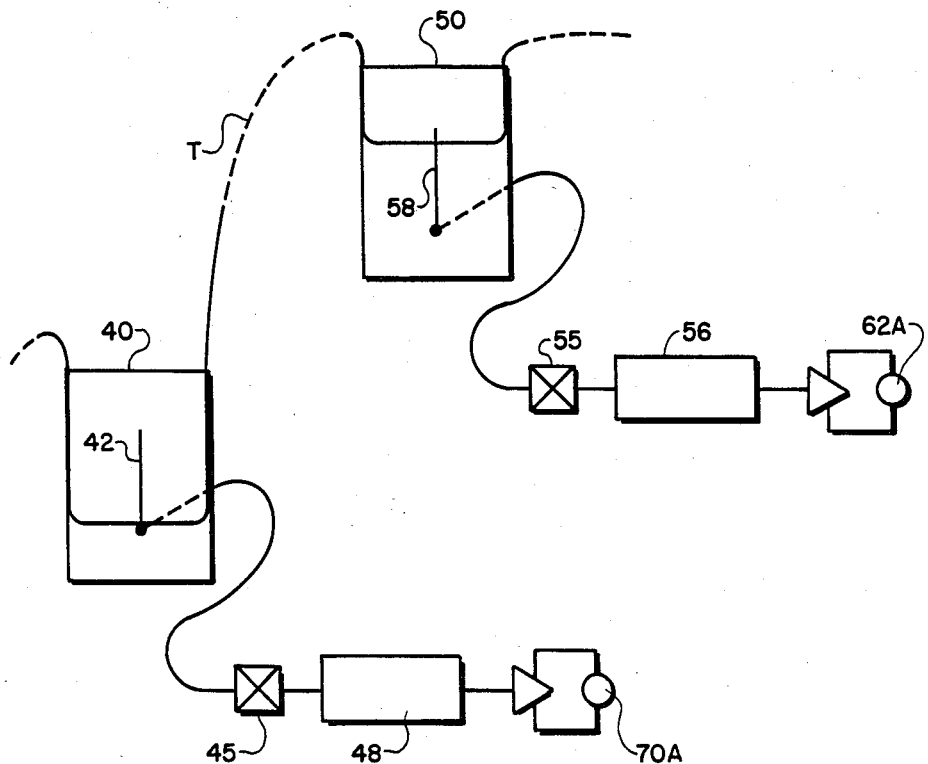
Figure 7:
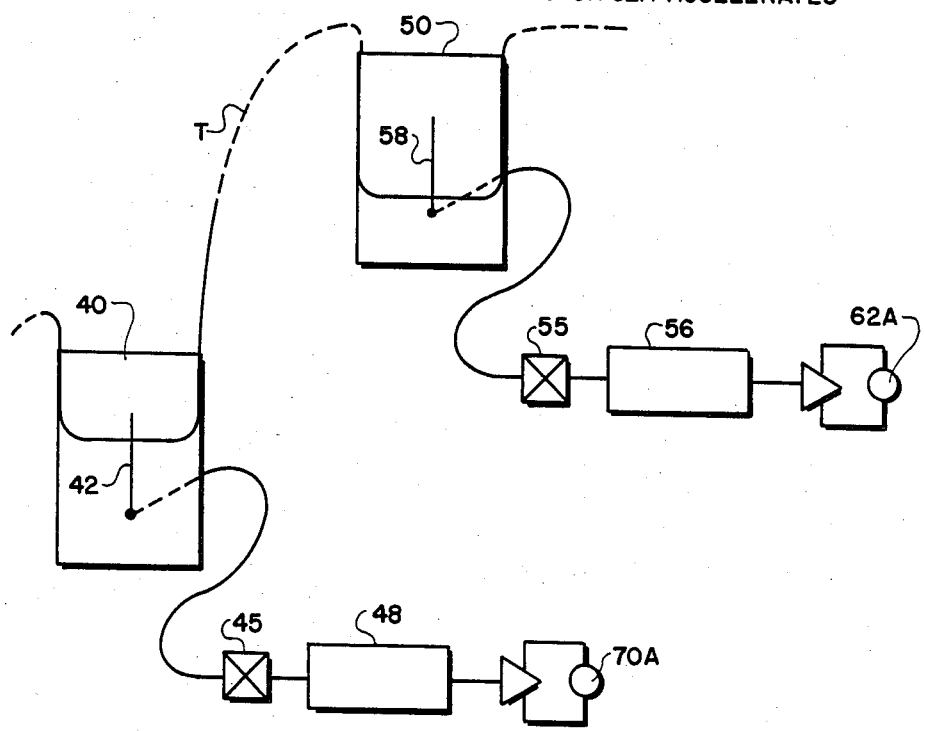
Figure 8:
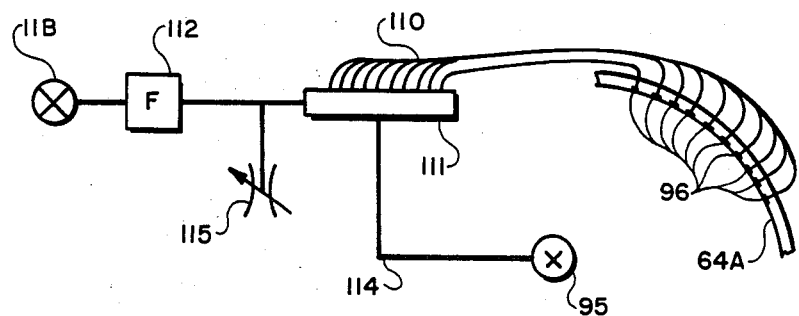
FIG. 8 is a schematic view of the pneumatic control circuit which controls the vacuum ports in the tape bin.

Upon starting, the controller applies low power to capstan 60. By rotating clockwise, capstan 60 removes slack from the tape path between vacuum column 40 and vacuum column 50. After a predetermined period, pinch roller 67 is engaged and capstan 60 is slowly excelerated. Capstan 60 pulls the tape across the reproduce heads 100 while the vacuum pressure in vacuum column 50 is pulling the tape from the right side of capstan 60 into vacuum column 50. The change in position as the tape enters vacuum column 50 is sensed by the vacuum transducer 55 which, as explained previously, results in an increase in rotational velocity of the servo motor 62A controlling capstan 62. The increase in velocity of capstan 62 pulls the tape upward in vacuum column 50 until an equilibrium is established. Any amount of tape supplied to vacuum column 50 by capstan 60 is removed by capstan 62. Therefore, the level of tape in vacuum column 50 remains relatively constant. Compare FIGS. 5, 6 and 7.

In a similar fashion, as capstan 60 removes tape from vacuum column 4, the change in position of the tape is sensed by vacuum transducer 48 associated with vacuum column 40 which results in an increase in the rotational velocity of servo motor 70A controlling capstan 70. The increase in velocity pulls tape out of bin 64 at a greater rate and delivers it to vacuum column 40 until equilibrium has been established. Compare FIGS. 5, 6 and 7.

In the case of both vacuum column 40 and vacuum column 50, the "servo" aspect of the operation means that the speed of capstans 70 and 62, respectively, is varying constantly as the loop of tape moves upwardly and downwardly within vacuum columns 40 and 50. Under ideal circumstances, the loop of tape would intersect sensing slots 42 and 58 and define a reference position at its approximate mid-point. See FIG. 5. Capstan 70 would deliver exactly the same length of tape per unit of time to vacuum column 40 as is being withdrawn by constant speed capstan 60. Likewise, capstan 62 would withdraw exactly the same length of tape per unit of time to vacuum column 50 as being delivered by constant speed capstan 60. The extent which tension variations within tape bin 64 vary from the ideal determines the extent to which the loop within vacuum column 40 changes position and, consequently, the extent to which the speed of capstan 70 is varied to always try to put the loop of tape back in the reference position at the approximate mid-point of sensing slot 42.

As is apparent, the primary purpose is to deliver the master tape across the record heads at a precise and uniform tension. However, once the tape passes the reproduce head 100, tension control on the tape ceases to be the primary object, and control of the speed of the tape becomes the factor over which primary control is sought. This is because capstan 60 is designed to rotate at a fixed speed of 480 ips (1219 cps), and must maintain this speed as closely as possible.

Therefore, the primary purpose of capstan 62 and vacuum column 50 is to exert a "pull forward" tension on the tape which ideally exactly matches the holdback tension exerted by vacuum column 40. Motor 60A is relieved of the duty of pulling against the holdback tension created by vacuum column 40. With the tension the same on both sides of capstan 60, capstan 60 can be devoted strictly to free running at a constant speed. Since the tape at the point between capstan 60 and pinch roller 67 is isolated on both sides from tension variations, there are no extraneous forces to cause even minute changes in the instantaneous rotational velocity of motor 60A. In fact, vacuum columns 40 and 50 function together so well that surface speeds of up to 700 ips (1778 cps) at capstan 60 have been achieved with little, if any, degradation in reproduction quality.

As the tape enters bin 64 through bin entrance 63, the tape lightly glazes the outside rail 64A and decelerates by the action upon it of vacuum ports 96, as described earlier.

Still referring to FIG. 3, the pack of tape can be seen in the extreme bottom portion of tape bin 64. As the tape settles into the bottom of bin 64, air is removed from between the layers of tape by a suction through vacuum port 95. By removing air from between the layers of tape, a reduction in pack height is achieved which effectively increases the capacity of the bin 64. Another effect is that the tape does not slide over the top of the pack upon initial contact. This results in loops that fit the bin from one end to the other and which are more manageable than long loops which extend up the sides and are subject to tangling.

The transfer belt 81 is a low coefficient of friction tape having very little surface area in contact with the pack. Belt 81 is driven by capstan 64 and moves in a slow, continuous motion causing the pack to invert itself. The inversion allows the tape to be removed from the bin 64 under very low tension because it is taken from the top of the pack. The speed of capstan 80 and consequently belt 81 is set semi-automatically by the transporter controller 11A. The longer the master tape, the slower belt 81 must move. Manual control can be effected by means of a potentiometer 22 which causes a linear change in the speed of capstan 80. Manual override by means of rheostat 22 is most often needed because of variations in the type of tape, temperature and humidity which alter the packing characteristics of the tape.

Capstan 70 rotates in a counterclockwise direction pulling tape out of bin 64 through bin exit 71. As tape is pulled off of the top of the pack, loops are formed. These loops are the result of uneven acceleration and it is common for sections of the tape to obtain velocities well above 480 ips (1219 cps). The dampening belts 85 and 86 therefore are set to contact any loop which may jump upward, thereby absorbing some of the energy.

Left undamped, loops having a large amplitude may twist and even destroy the master tape.

Vacuum guide 76 supplies a holdback tension to the back surface of the tape. Vacuum guide 76 is quite large and the area affected is correspondingly large to reduce the wear on any given section of the tape and to reduce the change in tension if a small section were to lose contact with vacuum guide 76 momentarily. The vacuum level applied to vacuum guide 76 is adjusted such that the tape tension between vacuum guide 76 and capstan 70 is slightly less than the tape tension between capstan 70 and vacuum column 40. This nearly balanced tension allows pinch roller pressure applied by pinch roller 74 to be very low, further reducing wear on the master tape.

Tape leaving capstan 70 is pulled by vacuum column 40 across guide roller 33 and down into vacuum column 40.

By careful reference to vacuum columns 40 and 50, and following carefully the threading pattern of the tape through both vacuum columns, it will be seen that one side of the tape is in the inwardly facing position of the lower vacuum column zone of vacuum column 40, and the opposite side of the tape is in vacuum communication within the lower vacuum column portion of vacuum column 60. The vacuum applied to the opposite sides of the tape results in a thorough cleaning of loose oxide particles and dust from both sides of the tape during each circuit without rubbing the surface of the tape against a cleaning medium.

During the "run" mode, sensor 35 detects the "window" in the master tape during each complete pass. The controller 11A times the interval for each pass and displays the information on display 14 alternately with the number of passes completed.

To stop transporter 10, the operator has three choices. "Stop" switch 19 is an emergency stop which will stop the tape in less than one second. In this case, the tape will usually not remain in its threaded path. Therefore, rethreading is necessary before restarting. When switch 19 is activated, controller 11A disengages pinch rollers 67, 66 and 74 and removes power from motors 60A, 62A, 70A and 80A. This allows the tape to be quickly pulled down into vacuum columns 40 and 50, thus rapidly stopping it. Vacuum guide 76 provides some holdback tension to keep tape around capstan 70, but all other guides become ineffective as the tape tension from guide 33 to capstan 60 drops.

Another method of stopping the tape is by activating "soft stop" switch 20. When this switch is activated, the controller begins to reduce the average power applied to capstan 60. As the tape begins to slow, vacuum columns 40 and 50, by operation of the column transducers 48 and 56, respectively, command a corresponding reduction in the speed of motors 62A and 70A. A tachometer (not shown) monitors capstan 60 and when a speed of 200 ips or less is reached, the controller switches into the normal "stop" routine. At this slow speed, the tape will remain threaded within the guides and capstans.

The third stopping method is called "cue stop" and is controlled by switch 21. The "window" in the tape is usually placed at or near the splice between the beginning and end of the tape. By detecting when the window passes sensor 35, the controller calculates the time which will pass before the window reaches sensor 35 again. If this time is greater than 15 seconds or less than 5 seconds when switch 21 is pressed, the tape is allowed to continue. When the window is within the predetermined distance from sensor 35, the controller automatically goes into a "soft stop" routine. Capstan 60 reduces tape speed down to 200 ips and then continues at that speed until sensor 35 detects the presence of the window. This signals the controller to stop, leaving the window near vacuum column 40 where it can be easily located.

Procedure for Unloading Master Tape

Once the tape has been stopped by using the "cue stop" switch 21, the window is located. The operator places an empty reel on hub 25. After the splice is removed, the end of the master tape exiting the upper section of bin 64 is threaded between pinch roller 66 and capstan 62, down into vacuum column 50, between pinch roller 67 and capstan 60, through sensor 36 and to the left of guide rollers 32 and 28. The tape is wrapped clockwise around the reel on hub 25. The other end of the tape, that which has just exited bin 64, is placed so that it may be pulled back into the bin by the loading process without damage.

Then, mode switch 15 is placed in the "unload" mode and switch 17, which controls the vacuum supply, is closed. Then the operator presses "start", the controller does a series of tests, as described above, to insure the presence of vacuum, proper threading and that capstan 60 is not rotating. If all conditions are valid, power is then applied to motor 26 causing it to rotate clockwise. Vacuum column 50 pulls the master tape down to the bottom of the column. This action creates a holdback tension of sufficient amount to provide good guidance around guide roller 28 and thus a good pack for storage of the master. When the end of tape passes sensor 36, the controller removes power from motor 26.

The major components of the pneumatic system are explained by reference to FIGS. 8, 9, 10 and 11. Vacuum ports 96 are connected by means of suitable hoses 110 to a volume chamber 111. Suction pressure is applied through volume chamber 111 by vacuum supply 11B. A filter 112 prevents contaminants from passing through vacuum ports 96 into vacuum supply 11B. Vacuum port 95, which removes air trapped between the loops of tape in the bottom of bin 64 is also connected to volume chamber 111 by a vacuum hose 114. Vacuum port 95 and the plurality of vacuum ports 96 are both controlled by a suitable vacuum pressure adjustment controller 115.

Figure 9:
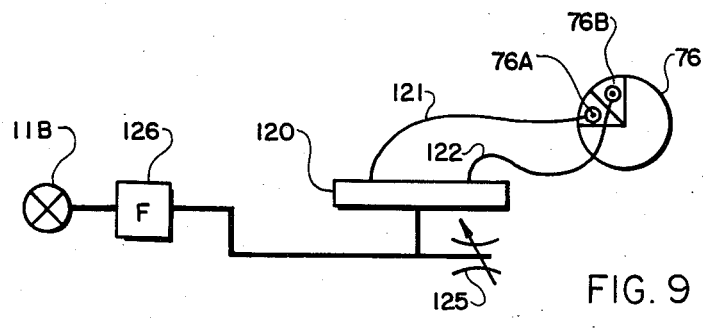
FIG. 9 is a schematic view of the vacuum guide roller.

Referring now to FIG. 9, the vacuum guide 76 includes two ports 76A and 76B. Both ports 76A and 76B communicate with a volume chamber 120 through vacuum hoses 121 and 122. Vacuum pressure and, hence, tension on the tape is controlled by a tension adjustment 125. A filter 126 prevents contaminants from being sucked into vacuum supply 11B.

Figure 10:
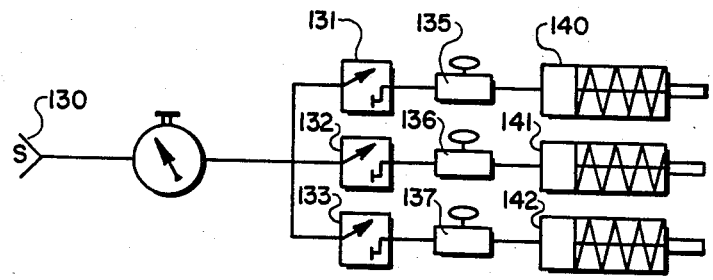
FIG. 10 is a schematic view of the pneumatic pinch roller controls.

Referring now to FIG. 10, positive air pressure is supplied from a source 130 through pneumatic switches 131, 132 and 133 (which are controlled by controller 11A) and through pressure regulators 135, 136 and 137 to pneumatic cylinders 140, 141 and 142. Pneumatic cylinders 140, 141 and 142 control, respectively, pinch rollers 67, 66 and 74.

Figure 11:
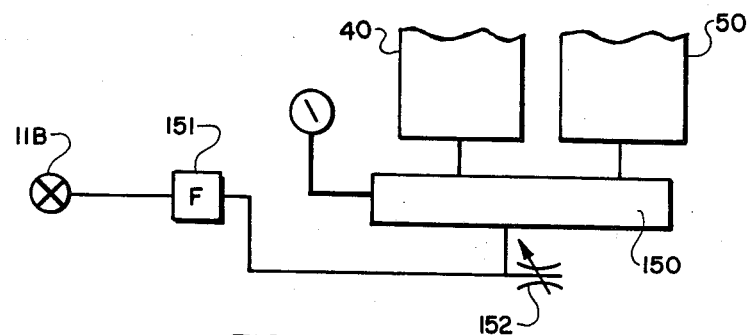
FIG. 11 is a schematic view of the pneumatic vacuum holdback and pull forward functions of the vacuum columns.

Referring now to FIG. 11, vacuum pressure for vacuum columns 40 and 50 is supplied through a volume chamber 150, which is supplied by vacuum supply 11B. A filter 151 prevents contaminants from being sucked through vacuum columns 40 and 50 into vacuum supply 11B. Tension adjustment is controlled by a vacuum pressure adjustment control 152.

A tape transporter is described above. Various details of the invention may be changed without departing from its scope. Furthermore, the foregoing description of the preferred embodiment of a tape transporter according to the present invention is provided for the purpose of illustration only and not for the purpose of limitation-the invention being defined by the claims.

I claim:

1. A closed loop, high-speed tape transporter of the type wherein a closed loop of recording tape is passed across a pick-up head where a signal on the loop of tape is conveyed downstream to at least one slaved duplicator, and wherein the loop of tape is conveyed from the pick-up head into a bin for accumulation and storage while a trailing length of the loop is passed across the pick-up head, and from the bin back across the pick-up head repeatedly whereby successive replications of the signal from the loop are conveyed from the pick-up head to the slaved duplicator, the improvement which comprises:

(a) vacuum supply means;
(b) a first vacuum column operatively connected to said vacuum supply means positioned in the plane of tape travel upstream from the pick-up head and downstream from the tape bin for receiving the loop of tape during its travel and exerting a vacuum induced holdback tension thereon;
(c) a second vacuum column operatively connected to said vacuum supply means and positioned in the plane of tape travel downstream of the pick-up head and upstream of the tape bin for exerting a vacuum induced pull forward tension on the tape in opposition to the holdback tension exerted on the tape by said first vacuum column;
(d) a motor-driven capstan positioned in the plane of tape travel intermediate the pick-up head and said second vacuum column, said capstan driven at a constant speed equal to the ideal reference tape duplication speed;
(e) tape drive means associated with said first and second vacuum columns for moving the tape;
(f) servo-control means for sensing changes in the position of the tape within said first and second vacuum columns caused by tension changes of the tape upstream and downstream of the pick-up head and sending a signal responsive to the change of position of the tape in said first and second vacuum columns to said tape drive means for varying the speed at which the tape is moved through said first and second vacuum columns and minimizing tension induced speed variation in the tape in the region of the pick-up head; and said first and said second vacuum columns each comprising an enclosure having a depth approximately that of the tape to provide a seal between that portion of the vacuum column outside the loop of the tape and that portion of the vacuum column inside the loop of the tape, and at least one sensing slot positioned in the vacuum column in vacuum communication with said vacuum supply means and interrupting the seal between the outside and inside of the loop of tape within the vacuum column and communicating information corresponding to tape position-related vacuum pressure to said servo-control means for servo-regulating the speed of said tape drive means.

2. A tape transporter according to claim 1, wherein said tape drive means includes a first servo motor for delivering tape to said first vacuum column and a second servo motor for delivering tape to said second vacuum column.

3. A tape transporter according to claim 2, wherein the motor driving said constant speed capstan comprises a synchronous motor.

4. A tape transporter according to claim 1, wherein said tape transporter includes a vacuum tape speed decreasing means for slowing tape speed and inducing the formation of regularly-sized loops in the tape as the tape descends into the bin for accumulation and storage.

5. A tape transporter according to claim 4, wherein said vacuum tape speed decreasing means comprises:
   a. said bin defining a tape deflecting surface against which tape is directed as it enters the bin; and
   b. a plurality of vacuum ports positioned in the line of tape travel on said surface to successively engage and exert a progressive drag thereon as the tape moves along said surface.

6. A tape transporter according to claim 5, wherein said tape deflecting surface comprises a curved wall of polished stainless steel.

7. A closed loop high-speed tape transporter of the type wherein a closed loop of recording tape is passed across a pick-up head where a signal on the loop of tape is conveyed downstream to at least one slaved duplicator, and wherein the loop of the tape is conveyed from the pick-up head into a bin for accumulation and storage while a trailing length of the loop is passed across the pick-up head, and from the bin back across the pick-up head repeatedly whereby successive replications of the signal from the loop are conveyed from the pick-up head to the slaved duplicator, said tape transporter including a tension control apparatus comprising:
   (a) vacuum supply means;
   (b) a first vacuum column operatively connected to said vacuum supply means for being positioned in the plane of tape travel intermediate the exit location of the loop of tape from the bin and the pick-up head for receiving the loop of tape during its travel and exerting a vacuum-induced tension thereon;
   (c) a first motor driven capstan positioned in the plane of tape travel intermediate the bin and said first vacuum column for pulling the loop of tape from the bin and delivering the tape to said first vacuum column;
   (d) servo-control means for sensing changes in the position of the tape within the first vacuum column caused by tension changes of the tape within the bin and sending a signal responsive to the change of position of the tape in said first vacuum column to said first motor driven capstan and varying the capstan speed responsively to the sensed positioned changes to maintain constant tension on the moving loop of tape as it is delivered to the pick-up head;
   (e) a second vacuum column completely connected to said vacuum supply means and positioned in the plane of tape travel intermediate the pick-up head and the entrance to the tape bin for exerting a vacuum induced pull forward tension on the tape sufficient to counterbalance the holdback tension exerted on the tape by said first vacuum column;
   (f) a second motor driven capstan positioned in the plane of tape travel intermediate the entrance to the tape bin and said second vacuum column for delivering the tape from said second vacuum column to said tape bin;
   (g) second servo-control means for sensing changes in the position of the tape within said second vacuum column and sending a signal responsive to the change of position of the tape in said second vacuum column to said second motor driven capstan and varying the second motor driven capstan speed responsively to the sensed position changes to maintain constant tension on the moving loop as it is delivered to said tape bin;
   (h) a reference speed capstan positioned downstream of said head and upstream of said second vacuum column for moving the loop of tape at a constant speed; and
   (i) a vacuum tape speed decreasing means for slowing tape speed and inducing the formation of regularly-sized loops in the tape as the tape descends into the bin for accumulation and storage.

8. A tape transporter for transporting a length of tape, comprising:
   (a) a reference capstan operating at a predetermined, fixed speed for moving the tape at that predetermined speed;
   (b) a first variable speed capstan positioned downstream of said reference capstan for applying a pull forward tension to said tape, said pull forward tension being sufficient to pull the tape forward at at least the speed of said reference capstan;
   (c) a second variable speed capstan positioned upstream of said reference capstan for applying a hold-back tension in opposition to the pull forward tension of said first variable speed capstan;
   (d) a tape bin cooperating with said first and second variable speed capstans for accumulating tape, if any, caused by variation in speed between said first and second variable speed capstans and said reference capstan; and
   (e) a vacuum tape speed decreasing means for slowing tape speed and inducing the formation of regularly-sized loops in the tape as the tape descends into the bin for accumulation and storage.

9. A tape transporter according to claim 1, 7 or 8, wherein said tape transport includes a motor driven tape capstan for delivering tape at high speed to the tape bin, the circumferential periphery of the capstan defining a crowned peripheral tape carrying surface to which surface at least the central portion of the tape conforms, thereby defining a cupped-shape to the tape as it moves over the crowned surface, the cupped-shape of the tape providing rigidity to the length of tape causing it to project in a straight line as it moves at high speed into the tape bin for accumulation and storage, resistance to tape skewing on the capstan and reliable removal of the tape from the capstan at the desired point of departure of the tape from the capstan without the use of knife-like strippers.

10. A tape transporter according to claim 9, wherein the circumferential periphery of the capstan defining said crowned surface comprises a raised central portion generally parallel to the axis of rotation of said capstan and two opposed edge portions separated by said raised central portion, each of said two opposed edge portions defining an angle acute to the axis of rotation of said capstan on the respective side of said capstan.

11. A tape transporter according to claim 10, wherein said raised central portion of said capstan is planar and wherein said two opposed edge portions of said capstan are each planar.

12. A tape transporter according to claim 1, 7 or 8, and including means for increasing the density of accumulation of tape in the bin comprising vacuum supply means and a vacuum port communicating with the interior of the tape bin and operatively connected to said vacuum supply means, said vacuum port positioned to extract air from and lower the air pressure in the region of the bin occupied by the loops of accumulated tape and inside the loops of tape sufficient to cause the accumulated tape to compress into tighter loops which occupy less space in the tape bin.

* * * * *